US012021968B2

(12) United States Patent
Braband

(10) Patent No.: US 12,021,968 B2
(45) Date of Patent: Jun. 25, 2024

(54) METHOD FOR DATA PROCESSING IN A COMPUTING ENVIRONMENT WITH DISTRIBUTED COMPUTERS AND RAILWAY APPLICATION

(71) Applicant: Siemens Mobility GmbH, Munich (DE)

(72) Inventor: Jens Braband, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 18/345,115

(22) Filed: Jun. 30, 2023

(65) Prior Publication Data

US 2024/0001977 A1 Jan. 4, 2024

(30) Foreign Application Priority Data

Jun. 30, 2022 (EP) ..................... 22182363

(51) Int. Cl.
*B61L 27/70* (2022.01)
*H04L 9/00* (2022.01)

(52) U.S. Cl.
CPC .............. *H04L 9/008* (2013.01); *B61L 27/70* (2022.01); *H04L 2209/34* (2013.01)

(58) Field of Classification Search
None
See application file for complete search history.

(56) References Cited

U.S. PATENT DOCUMENTS 5,790,662 A * 8/1998 Valerij ................... G06K 19/16
380/2
9,900,147 B2 * 2/2018 Laine ................... H04L 9/0618
(Continued)

FOREIGN PATENT DOCUMENTS

| CN | 117335953 A | * | 1/2024 | ............. B61L 27/70 |
| EP | 3591550 A1 | * | 1/2020 | ............. G06F 21/14 |
| EP | 3818458 B1 | * | 2/2022 | ............. G06F 21/14 |
| EP | 4087177 A1 | * | 11/2022 | ............. H04L 9/008 |
| EP | 4300873 A1 | * | 1/2024 | ............. B61L 27/70 |
| JP | 7371034 B2 | * | 10/2023 | ............. G06F 21/14 |
| WO | WO-2020008045 A1 | * | 1/2020 | ............. G06F 21/14 |
| WO | WO-2022233605 A1 | * | 11/2022 | ............. H04L 9/008 |

OTHER PUBLICATIONS

Article 32—Improved Data Integrity Proofs using Additive Homomorphic Encryption for Remote Storage Parth Shah1* and Amit Ganatra2, Indian Journal of Science and Technology, vol. 9(29), DOI: 10.17485/ijst/2016/v9i29/90783, Aug. 2016.

*Primary Examiner* — Kevin R Steckbauer
(74) *Attorney, Agent, or Firm* — Laurence A. Greenberg; Werner H. Stemer; Ralph E. Locher

(57) ABSTRACT

A method for data processing in a computing environment with distributed computers. Data to be processed is transmitted homomorphically encrypted from a client computer to a host computer, the data to be processed is processed homomorphically encrypted by the host computer and the processed data is transmitted homomorphically encrypted from the host computer to the client computer. Here, the data to be processed is additionally coded before the homomorphic encryption, both the coded data and the uncoded data are homomorphically encrypted and transmitted to the host computer, both are processed by the host computer while retaining the homomorphic encryption computer and the processed data, coded and uncoded are transmitted homomorphically encrypted from the host computer to the client computer. When the uncoded data and the coded data, after decoding, are compared, the result provides proof of the integrity of the data.

10 Claims, 2 Drawing Sheets

(56) References Cited

U.S. PATENT DOCUMENTS

| | | | |
|---|---|---|---|
| 11,409,848 B2* | 8/2022 | Mallon | H04L 9/06 |
| 2017/0180115 A1* | 6/2017 | Laine | H04L 9/0618 |
| 2017/0244553 A1* | 8/2017 | Savry | G06F 21/72 |
| 2020/0076614 A1* | 3/2020 | Georgieva | H04L 9/302 |
| 2021/0099308 A1 | 4/2021 | Abbas | |
| 2021/0326413 A1* | 10/2021 | Mallon | G06F 21/14 |
| 2022/0247551 A1* | 8/2022 | Joye | H04L 9/008 |
| 2023/0327847 A1* | 10/2023 | Moshkowich | H04L 9/008 380/28 |
| 2024/0001977 A1* | 1/2024 | Braband | B61L 27/70 |

\* cited by examiner

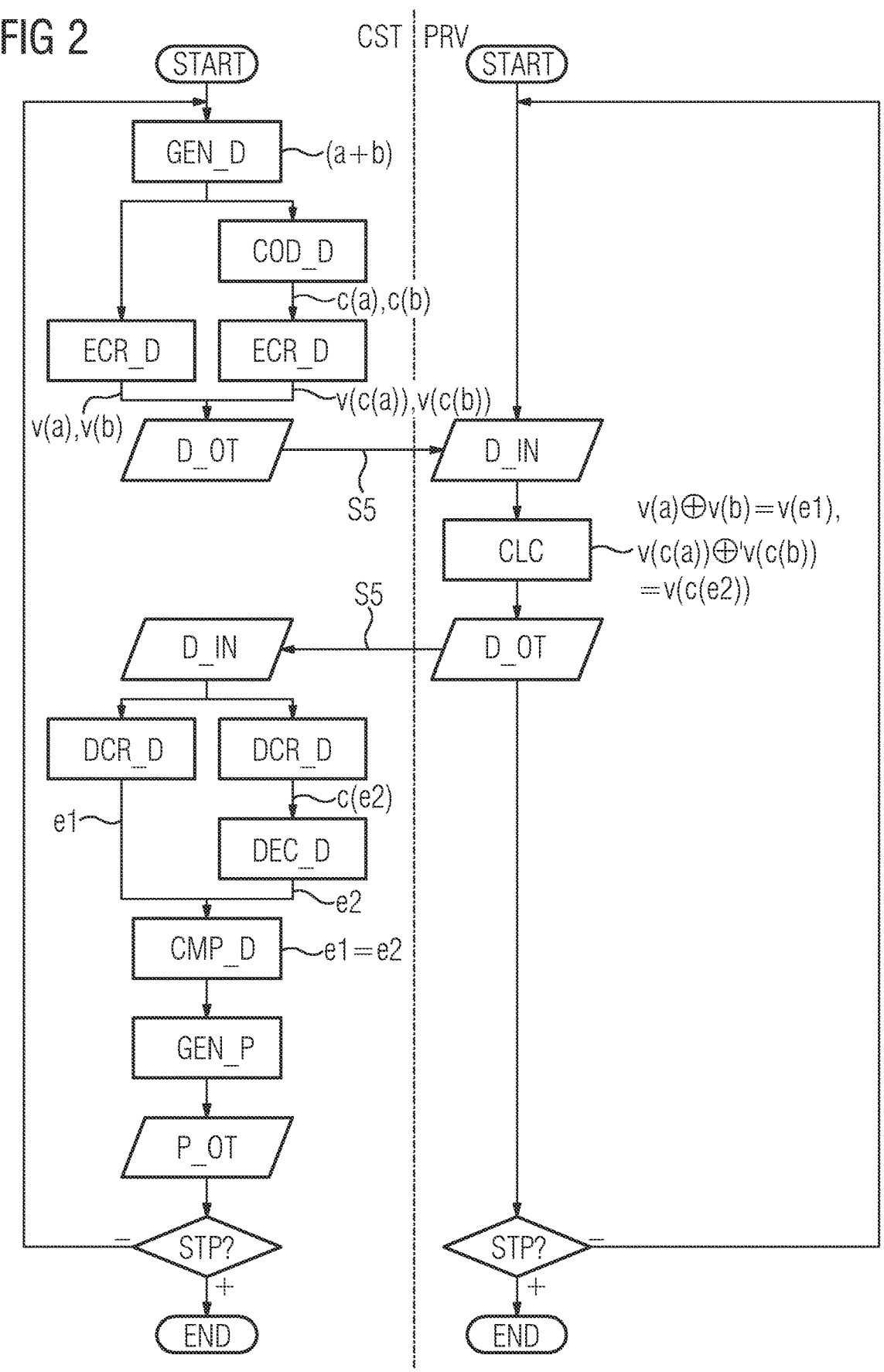

METHOD FOR DATA PROCESSING IN A COMPUTING ENVIRONMENT WITH DISTRIBUTED COMPUTERS AND RAILWAY APPLICATION

CROSS-REFERENCE TO RELATED APPLICATION

This application claims the priority, under 35 U.S.C. § 119, of European Patent Application EP22182363.6, filed Jun. 30, 2022; the prior application is herewith incorporated by reference in its entirety.

FIELD AND BACKGROUND OF THE INVENTION

The invention relates to a method for computer-assisted data processing in a computing environment with distributed computers, in which
 data to be processed by a client computer is transmitted encrypted homomorphically to a host computer,
 subsequently the data to be processed is processed encrypted homomorphically by the host computer,
 subsequently the processed data is transmitted encrypted homomorphically from the host computer to the client computer.
The invention also relates to track-side facilities for a railway system and in particular to a rail-bound vehicle. Lastly the invention relates to a computer program product, wherein the computer program product is equipped with program commands for carrying out the method.

In the future even secure computations are to be carried out in the Cloud, wherein the data could possibly be confidential, because it might originate from various competitors, for example, who wish to collect data for example but do not wish to disclose their raw data, for example with the state-oriented maintenance of railway systems. In this case the overall result should be available to all authorized users but be reliable and tamper-proof when it is.

What is meant by safety in connection with this invention is in the sense of operational safety (also simply called safety below) and transmission safety (also called security below). Operationally safe computations are required in rail operation for example. The occurrence of errors should be as limited as possible in the interest of safe operation. When a Cloud is used, however, transmission safety must also be guaranteed.

Methods of homomorphic encryption for guaranteeing transmission safety have long been known but have only recently become fast enough for practical uses for them to able to be considered. With said methods theoretically completely confidential computations can be carried out on encrypted data but the reliability is not ensured in such cases, since homomorphic methods, through their construction, are always able to be manipulated (known as malleability) and hereby a security program once again arises (Safety and Security).

Malleability is understood as a possible characteristic of cryptographic algorithms. An encryption is deemed "malleable," if it is possible to change a secret text without knowledge of the plaintext and of the key in such a way that it leads during decryption to a specific change of the plaintext. In general this is an unwanted characteristic, which makes various attacks and errors possible. Therefore reference is also made to the physical attribute "non-malleability" when this characteristic does not exist.

A homomorphic encryption possesses homomorphic characteristics, through which computations can be carried out on the secret text, which correspond to mathematical operations on the corresponding plaintexts, without knowing or decrypting the plaintext. With the aid of homomorphic cryptography computations can be distributed to various systems (for example servers), which do not trust one another. Encrypted data is held in a Cloud for example. There it can be searched or processed without decrypting it. The result is sent back encrypted. This means that the Cloud provider does not know either the data or the results.

There exist several cryptosystems, which at least allow partial homomorphic encryption at an acceptable cost. Above and beyond that, fully homomorphic encryption systems also exist, which however, due to their complex design and intensive computing needs, have yet to find a use. Examples of homomorphic encryption systems are:
 Goldwasser-Micali cryptosystem
 Benaloh cryptosystem
 Paillier cryptosystem
 Okamoto-Uchiyama cryptosystem In general an encryption v relating to an operation+is homomorphic, when the following applies (shown here for the computing operation "+")

$$v(a) \oplus v(b) = v(a+b)$$

That is, the operation can be carried out on the encrypted data v(a) and v(b) and only the person that can decrypt it knows the unencrypted result e=a+b. In general however many further homomorphic operations are still needed in order to be able to set up a sensible system.

A simple example is the one-time-pad, where the encryption consists of the XOR (Exclusive OR) operation with a key k. This simple example allows the problem of malleability to be explained. Even if v(a) is unknown, an attacker could exclusively OR v(a) with an error f, i.e., then forward v(a) XOR f instead of v(a), and during the decryption a XOR f is then obtained as the result, without the attacker having to know a. Since however simple errors such as flipped bits and the like are also allowed to be represented as XOR with an error f, such an error can also occur by chance.

Proposed solutions for this problem can be found for example in the Indian Journal of Science and Technology, Vol 9(29), DOI: 10.17485/ijst/2013/v9i29/90783, August 2016. The proposed solutions are of a cryptographic nature, i.e., they need additional keys, crypto algorithms or even blockchains. This gives rise to a considerable computing overhead.

SUMMARY OF THE INVENTION

The object of the invention is to make homomorphically encrypted processing by a host computer possible—here, by a method, a track-side facility of railway operation, or a vehicle, such as a track-bound—in which a manageable computing effort results in the protection for the integrity of the data to be processed or the processed data. Moreover, it is an object of the invention to specify a computer program product with which the aforesaid method can be carried out.

With the above and other objects in view there is provided, in accordance with the invention, a method for computer-assisted data processing in a computing environment with distributed computers, the method comprising:
 subjecting data to be processed to homomorphic encryption to generate homomorphically encrypted uncoded data to be processed;

additionally coding the data to be processed before the homomorphic encryption to generate homomorphically encrypted coded data to be processed;

transmitting the uncoded data to be processed and the coded data to be processed in homomorphically encrypted form from a client computer to a host computer;

subsequently processing the coded data to be processed and the uncoded data to be processed in homomorphically encrypted form by the host computer to generate coded processed data and uncoded processed data;

subsequently transmitting the coded processed data and the uncoded processed data in homomorphically encrypted form from the host computer to the client computer.

In other words, the objects of the invention are achieved with the claims subject matter specified at the outset in accordance with the invention in that the data to be processed is additionally coded before the homomorphic encryption, both the coded data to be processed and also the uncoded data to be processed are homomorphically encrypted and transferred to the host computer, subsequently both the coded data to be processed and also the uncoded data to be processed are processed homomorphically encrypted by the host computer, subsequently both the coded processed data and also the uncoded processed data are transmitted homomorphically encrypted from the host computer to the client computer.

Data to be processed thus represents an input for the host computer and the processed data represents an output. The host computer thus carries out a task with operators, and this is the service, which is provided for example in a Cloud environment to which the host computer belongs.

The processing in the host computer is undertaken with homomorphically encrypted data. In other words the data to be processed is transmitted homomorphically encrypted to the host computer and is not decrypted there but is processed homomorphically encrypted. The data is also sent back homomorphically encrypted. In other words there is a decryption of the homomorphically encrypted data (the processed data) only on the client computer or in a secure environment linked to the client computer. The data to be processed is also encrypted by the client computer.

In accordance with the invention specific solutions are thus to be proposed, which in accordance with the invention exploit characteristics of safety mechanisms (which are used in any case in safety-relevant applications such as railway applications) and managed with as little overhead as possible.

It must be assumed that an attacker knows the complete method, i.e. also the homomorphic encryption as well as all operations, but just not the key that is actually being used (Kerckhoff's principle). During processing on the server or in the Cloud actual attacks may not be assumed as a basis, but all error modes must be considered (accidental errors such as flipped bits etc.).

In accordance with the invention there is provision, in addition to the computations which are running on the data a and b, to demand additional computations, which run on coded data c(a) and c(b). The coding algorithm c is different from the homomorphic encryption algorithm v and in this case is ideally not homomorphic (so that the attacker is also not able to exploit the malleability of homomorphic algorithms here), as an alternative c at least could be kept secret, if c is also homomorphic. The attacker is therefore not able with a high probability to falsify the data and the codes matching one another. This could be undertaken for example by a permutation or similar transformation of the data.

"Processor-assisted" or "computer-implemented," in the context of the invention can be understood as an implementation of the method in which at least one computer or processor carries out at least one method step of the method.

The term "processor" or "computer" covers all electronic devices with data processing characteristics. Computers can for example be personal computers, servers, handheld computers, mobile radio devices and other communication devices that process data with computer assistance, processors and other electronic devices for data processing, which can preferably also be connected together into a network.

In the context of the invention a "processor" can be understood for example as a converter, a sensor for creation of measurement signals or an electronic circuit. A processor can in particular involve a central processing unit (CPU), a microprocessor, a microcontroller, or a digital signal processor, possibly in combination with a memory unit for storage of program commands, etc. A processor can also be understood as a virtualized processor or a soft CPU.

In the context of the invention a "memory unit" can for example be understood as a computer-readable memory in the form of a Random-Access Memory (RAM) or data memory (hard disk or data medium).

"Interfaces" can be realized as hardware, for example hard-wired or as a radio link, and/or software, for example as interaction between individual program modules or program parts of one or more computer programs.

A "Cloud" is to be understood as an environment for "cloud computing." This means an IT infrastructure that is made available via interfaces of a network such as the Internet. As a rule it contains storage space, computing power or software as a service, without these having to be installed on the local computer using the Cloud. The services offered within the framework of Cloud computing comprise the entire spectrum of information technology and include inter alia infrastructure, platforms and software.

"Program modules" are to be understood as individual functional units that make an inventive program execution of method steps possible. These functional units can be realized in a single computer program or in a number of computer programs communicating with one another. The interfaces realized here can be implemented as software within a single processor or as hardware when a number of processors are used.

Unless stated otherwise in the description given below, the terms "create," "determine," "compute," "generate," "configure," "modify," and the like preferably relate to processes that produce and/or modify data and/or transform the data into other data. In such cases the data is, in particular, present as physical variables, for example as electrical impulses or also as measured values. The required instructions and program commands are collected together in a computer program as software. Furthermore the terms "send," "receive," "read in," "read out," "transmit," and the like relate to the interaction of individual hardware components and/or software components via interfaces.

In accordance with one embodiment of the invention,
both the coded processed data and also the uncoded processed data to be decrypted after transmission to the client computer and for the decrypted coded data additionally to be decoded, and
the decrypted as well as decoded processed data and the decrypted processed data to be checked for a match.

If within the context of this invention reference is made to decrypted processed data then this involves that data that has not been coded beforehand, but only homomorphically encrypted. If within the context of this invention reference is made to decrypted and also to the coded processed data, then this involves that data that has been coded and homomorphically encrypted during the processing.

Since the data is only decrypted after processing by the host computer and where necessary decoded, it is possible that computing operation can be carried out in a Cloud for example without the Cloud provider knowing the data, and the user can now advantageously check with the aid of their coding after the decryption whether computation in the Cloud was correct, in that they check afterwards whether the $c(e2)=c(a+b)$ returned is compatible with the computed result $e1=a+b$, i.e., $e1=e2$. This is naturally only worthwhile when the operation $\oplus$ carried out in the Cloud is significantly more complex than the encryption v and the coding c. In practice this will be the case when a plurality of operations are to be carried out with the data and not just one operation, as has been explained above to illustrate the principle.

In accordance with one embodiment of the invention, after the checking of the decrypted and also decoded processed data and the decrypted data for a match, a check result is generated.

The check result can advantageously be used to influence processes in the sphere of the client, in particular processes which run in the client computer. In particular there can be a reaction when a match between the results is not present, because this allows it to be concluded that an error has occurred in the processing of the data or an attack has been made on the executing computing environment, which has led to a falsifying of the data in the sense already described.

In accordance with one embodiment of the invention there is provision for an error signal to be created when the check result has the content that the decrypted and also decoded processed data and the decrypted data do not match.

An error signal can advantageously be used for further data processing. This is for example able to be evaluated by the client computer. An error signal in conjunction with this invention merely means that a match between the compared results is not present and therefore at least one of the results must be incorrect. The reason can be that an error has occurred in the processing of the data or an attack has been made on the executing computing environment, which has led to a falsification of the data in the sense already described.

In accordance with one embodiment of the invention there is provision for data to be coded in such a way that the same operators can be used for the coded and encrypted data to be processed as are used for the data to be processed that is only encrypted.

In accordance with this embodiment of the invention c is chosen so that the operation $\oplus$ is also sensible for the coded data $c(a)$ and $c(b)$, i.e. that when the coded data is used after decoding of the result, the same result emerges as when the non-coded data is used.

In accordance with one embodiment of the invention there is provision for matched operators to be used for the coded and encrypted data to be processed, which generate the same result as the associated operators in each case for the data to be processed that is only encrypted.

In accordance with this embodiment of the invention the operation must be changed accordingly ($\oplus'$), so that results compatible with the coding emerge, which can then be compared with the result of the operation of the non-coded data.

The objects of the invention are alternatively also achieved with the subject matter specified at the outset in accordance with the invention by the client computer being configured to carry out a method as claimed in one of the preceding claims on the client side and in doing so to encrypt the data to be processed homomorphically to additionally code the data to be processed before the homomorphic encryption, to encrypt both the coded data to be processed and also the uncoded data to be processed homomorphically and to transmit it to a host computer, to receive both the coded processed data and also uncoded processed data homomorphically encrypted from the host computer.

The said object is alternatively also achieved with the subject matter (track-side facility of a railway system, vehicle, in particular rail-guided vehicle) in accordance with the invention by this having a client computer as described above.

With the apparatuses mentioned above the advantages that have already been explained in conjunction with the method explained in greater detail above can be achieved. What has been stated for the inventive method also applies correspondingly for the inventive apparatus.

Furthermore a computer program product with program commands for carrying out the said inventive method and/or its exemplary embodiments is claimed, wherein by means of the computer program product the inventive method and/or its exemplary embodiments are able to be carried out.

The computer program is provided in the form of a program data block as a file, in particular as a downloadable file, or as a data stream, in particular as a download data stream, of the computer program product. This can for example also be provided as a partial download, which consists of a number of parts. Such a computer program product is for example read into a system using the provision apparatus, so that the inventive method is made to execute on a computer.

Further details of the invention are described below with the aid of the drawing. Elements of the drawing that are the same or that correspond to one another are each provided with the same reference character and are only explained more than once in so far as differences emerge between the individual figures.

It should be understood that the exemplary embodiments explained below involve preferred forms of embodiment of the invention. In the exemplary embodiments the described components of the forms of embodiment each represent individual features of the invention to be considered separately from one another, which also develop the invention separately from one another and are thus to be seen, individually or in a combination other than that shown, as an element of the invention. Furthermore the described components are also able to be combined by the features of the invention described above.

Specific features and combinations which are considered as characteristic for the invention are set forth in the appended claims.

Although the invention is illustrated and described herein as embodied in a method for data processing in a computing environment with distributed computers and railway application, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 2 shows an exemplary embodiment of the inventive method as a flow diagram, wherein the individual method steps can be realized individually or in groups by program modules and wherein the functional units and interfaces in accordance with FIG. 2 are indicated by way of example.

DETAILED DESCRIPTION OF THE INVENTION

Figure 1:
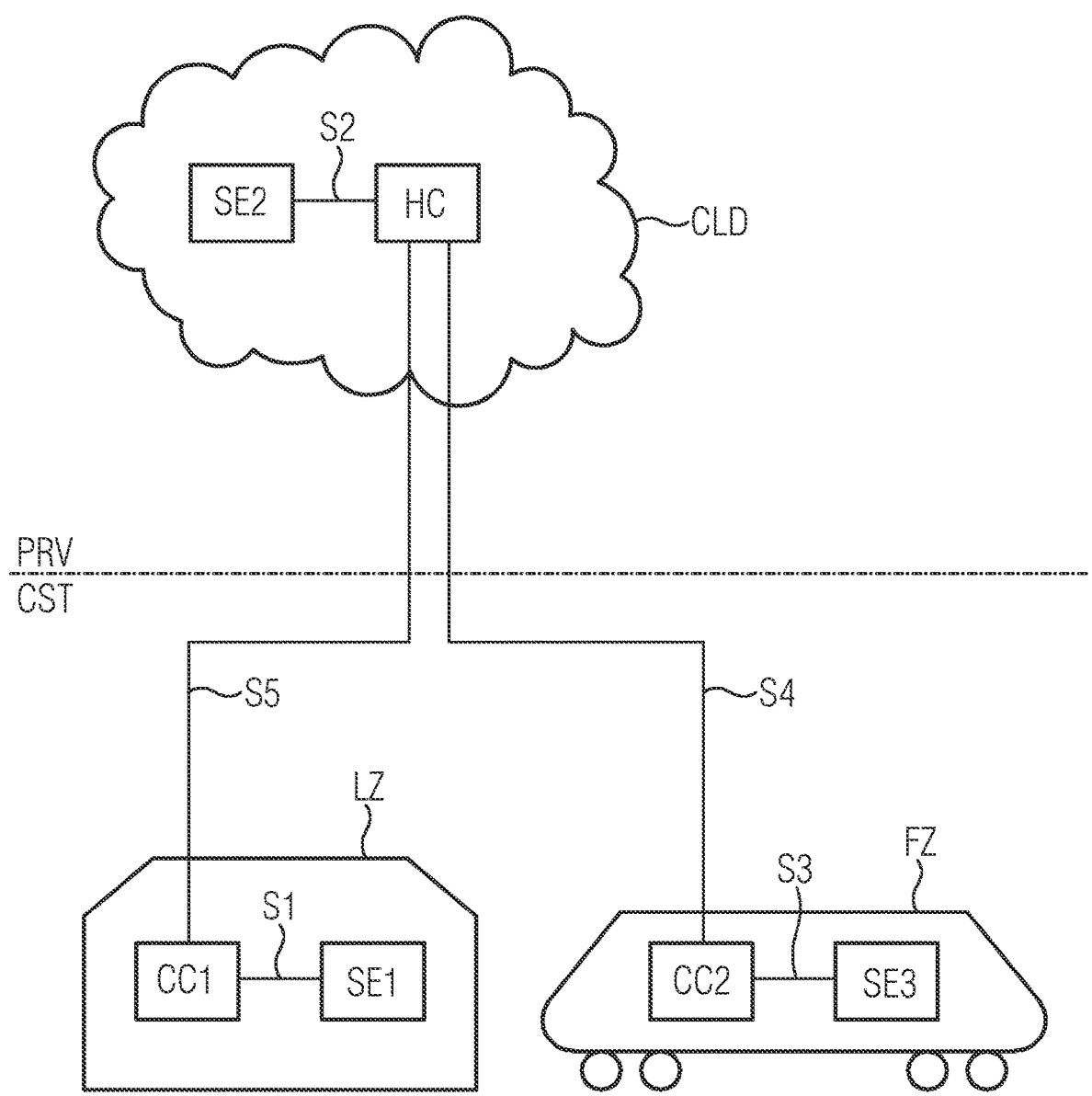
FIG. 1 shows an exemplary embodiment of a railway infrastructure with the inventive computing environment with its functional relationships schematically, wherein an exemplary embodiment shows a computer infrastructure which according to the computing environment is a block diagram and wherein the individual functional units contain program modules, which can each run in one or more processors, so that the interfaces can accordingly be implemented as software or as hardware.

Referring now to the figures of the drawing in detail and first, in particular, to FIG. 1 thereof, there is shown a computing environment, which is divided into a provider PRV and a customer CST (separated by a dotted and dashed line). The provider provides a service in a Cloud CLD, wherein a host computer HC, which is connected via a second interface S2 to a second memory unit SE2, is shown by way of example in the Cloud CLD.

The customer CST operates a railway application. This is shown by way of example by a control center LZ with a client computer CC1, which is connected via a first interface S1 to a first memory unit SE1. Moreover the customer operates a vehicle FZ, which is equipped with a second client computer CC2 and which is connected via a third interface S3 to a third memory facility SE3. The first client computer CC1 is connected via a fifth interface S5 to the host computer HC and the second client computer CC2 via a fourth interface S4 likewise to the host computer HC.

The execution sequence of the method can now be taken from FIG. 2. This figure too is divided into method steps, which are each carried out at the customer CST or at the provider PRV (separated by a dotted and dashed line). To this end the method is first started both at the customer CST and also at the provider PRV.

Thereafter, at the customer CST, in a generation step for data GEN_D, a dataset is generated, which is to be processed by the provider. This therefore consists of the data to be processed. This is shown representatively by the letters a and b. Moreover an addition is to be carried out with the data by way of example as a computing operation. This is indicated in FIG. 2 by the expression (a+b).

In a next step the data to be processed is coded in parallel once in a coding step COD_D for data and subsequently encrypted in an encryption step ECR_D for the data, wherein this involves a homomorphic encryption. In the parallel step, the data is likewise immediately homomorphically encrypted without a coding step in the step ERC_D.

The result of the coding is indicated in FIG. 2 as c(a) and c(b). After the homomorphic encryption on the one hand the encrypted data v(a) and v(b) is produced from the non-coded data. The encrypted coded data v(c(a)) and v(c(b) is produced from the coded data. Both the encrypted coded data and also the merely encrypted data is subsequently made available via the fifth interface S5 to the provider. This is carried out in an output step for data D_OT on the customer CST side and a corresponding input step D_IN on the provider PRV side.

Now, in a computation step CRC, the provider starts the data processing. This is likewise shown in FIG. 2. The computations are carried out with an operator $\oplus$, which on account of the homomorphic encryption of the data to be processed, leads to the computation being able to be carried out with encrypted data. The encrypted result after decryption corresponds to that which would have been produced in the original operation (i.e., an addition in the exemplary embodiment shown in FIG. 2).

A computing operation also exists for the encrypted coded data, for which the same applies. In other words the result that is computed for the encrypted coded data using the operator $\oplus'$, in a subsequent decryption and subsequent decoding, obtains precisely the result. That is, the results e1 and e2 must be the same per se.

After the computation step is carried out there is a data transmission in an output step for the data D_OT at the provider PRV via the fifth interface S5 and a corresponding input step D_IN at the customer CST.

The customer can now subject the received processed data in parallel in the case of the results v(e1) merely to a decryption step DCR_D with the result e1 and in the case of the result v(c(e2)) first of all to a decryption step DCR_D with the intermediate result c(e2) and subsequently to a decoding step DEC_D with the unencrypted result e2.

In a subsequent comparison step for data, CMP_de, a check is made as to whether the two results match. In other words whether the following applies: e1 equals e2. In a subsequent generation step for a check result GEN_P, the check result data is acquired technically. An error signal can be involved here for example, which is only generated when the checking step for the match of the result CP_de establishes that e1 is not the same as e2. However, a check result can be generated also in the case of a match between the results e1 and e2. Subsequently, in an output step for the check result P_T, the check result is made available for further processing.

Both for the method running at the customer CST and also for the method running at the provider PRV an interrogation is processed as to whether the method should be ended. If this is the case the method is ended, if this is not the case, then in the case of the customer CST a recursion loop leads back to the first step of the method and thus to the generation of further data and in the case of the provider it leads to the first step of a data entry D_en via the fifth interface S5.

Once more in a brief abstract of the disclosure, and relating to some of the primary characteristics: The invention relates to a method for data processing in a computing environment with distributed computers (CC1, CC2, HC), in which data to be processed is transmitted homomorphically encrypted from a client computer (CC1, CC2) to a host computer (HC), the data to be processed is processed homomorphically encrypted by the host computer and the processed data is transmitted homomorphically encrypted from the host computer to the client computer. In accordance with the invention there is provision for the data to be processed additionally to be coded before the homomorphic encryption, for both the coded data to be processed and also the uncoded data to be processed to be homomorphically encrypted and transmitted to the host computer, subsequently for both the coded data to be processed and also the uncoded data to be processed to be processed homomorphically encrypted by the host computer and subsequently for both the coded processed data and also the uncoded processed data to be transmitted homomorphically encrypted from the host computer to the client computer. Through this the possibility advantageously arises of providing proof of the integrity of the data by a comparison of the two results, i.e., the result of the homomorphically encrypted and coded data and the result of the just homomorphically encrypted data. Also protected are railway applications and a computer program.

The following is a list of reference characters used in the above description:

LZ Control center
FZ Vehicle
CLD Cloud
PRV Provider
CST Customer
HCP Host computer
CCP1 . . . CCP2 Client computer
SE1 . . . SE3 Memory facility
S1 . . . S5 Interface
CLC Computing step
GEN_D Generation step for data
GEN_P Generation step for check result
COD_D Coding step for data
DEC_D Decoding step for data
ECR_D Encryption step for data
DCR_D Decryption step for data
D_IN Input step for data
D_OT Output step for data
CMP_D Comparison step for data
P_OT Output step for check result
STP? Interrogation step for end

The invention claimed is:

1. A method for computer-assisted data processing in a computing environment with distributed computers, the method comprising:
   subjecting data to be processed to homomorphic encryption to generate homomorphically encrypted uncoded data to be processed;
   additionally coding the data to be processed before the homomorphic encryption to generate homomorphically encrypted coded data to be processed;
   transmitting the uncoded data to be processed and the coded data to be processed in homomorphically encrypted form from a client computer to a host computer;
   subsequently processing the coded data to be processed and the uncoded data to be processed in homomorphically encrypted form by the host computer to generate coded processed data and uncoded processed data;
   subsequently transmitting the coded processed data and the uncoded processed data in homomorphically encrypted form from the host computer to the client computer.

2. The method according to claim 1, which further comprises:
   decrypting the coded processed data and the uncoded processed data after receipt by the client computer to generate decrypted processed data and decrypted coded processed data, and decoding the decrypted coded processed data to form decrypted decoded processed data; and
   comparing the decrypted processed data with the decrypted decoded processed data to check for a match.

3. The method according to claim 2, which further comprises generating a check result after comparing the decrypted processed data with the decrypted decoded processed data.

4. The method according to claim 3, which further comprises generating an error signal when the check result indicates that the decrypted decoded processed data and the decrypted processed data.

5. The method according to claim 1, which comprises coding the data in such a way that the same operators can be used for the coded and encrypted data to be processed as the merely encrypted data to be processed.

6. The method according to claim 1, which comprises using matched operators for the coded and encrypted data to be processed, which generate the same result as associated operators in each case for the merely encrypted data to be processed.

7. A track-side facility for a railway system, comprising a client computer configured to perform the corresponding steps of the method according to claim 1.

8. A vehicle, comprising a client computer configured to perform the corresponding steps of the method according to claim 1.

9. The vehicle according to claim 8, wherein the vehicle is a rail-bound track-side rail vehicle.

10. A non-transitory computer readable medium, storing instructions which, when executed by a computer of a system with distributed computers, cause the computer to carry out a method with the following steps:
   providing data to be processed as uncoded data;
   additionally coding the data to be processed to form coded data;
   homomorphically encrypting the uncoded data and the coded data;
   transmitting the homomorphically encrypted uncoded data to be processed and the homomorphically encrypted coded data to be processed to a host computer; and
   subsequently receiving coded processed data and uncoded processed data in homomorphically encrypted form from the host computer at the client computer.

* * * * *